Dec. 5, 1933.    B. D. BEDFORD    1,938,368
ELECTRIC VALVE FREQUENCY SYSTEM
Filed Aug. 1, 1933
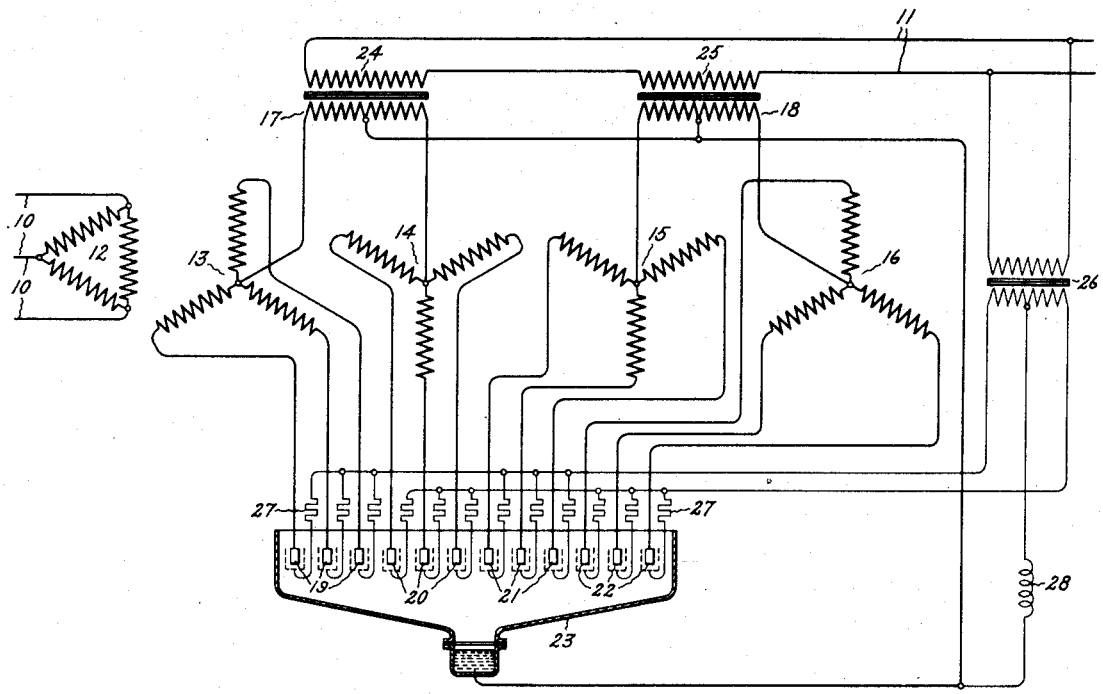
Inventor:
Burnice D. Bedford,
by  Harry E. Dunham
His Attorney.

Patented Dec. 5, 1933

1,938,368

UNITED STATES PATENT OFFICE 1,938,368

ELECTRIC VALVE FREQUENCY SYSTEM

Burnice D. Bedford, Schenectady, N. Y., assignor to General Electric Company, a corporation of New York Application August 1, 1933. Serial No. 683,132

3 Claims. (Cl. 172—281)

My invention relates to electric valve frequency changing systems and more particularly to such systems in which a plurality of electric valve converting apparatus cooperate to supply a common load circuit.

Heretofore there have been devised numerous electric valve converting systems for transmitting energy between direct and alternating current circuits, direct current circuits of different voltages or independent alternating current circuits of the same or different frequencies. In many of these arrangements of the prior art the various transformer windings comprising a portion of the system have not been employed to their maximum utility, while at the same time, the circuit has required that the cathodes of many of the electric valves be at different potentials, thus precluding the use of a multiple anode, single cathode electric valve, such as a grid controlled mercury arc rectifier.

It is an object of my invention to provide an improved electric valve converting system which will overcome the above-mentioned disadvantages of the arrangements of the prior art and which will be simple and reliable in operation.

It is another object of my invention to provide a new and improved electric valve frequency changing system which will enable the transforming apparatus forming a part of the system to operate at an improved utility and which will, at the same time, permit the use of a multiple anode, single cathode electric valve device or a plurality of electric valves having a single cathode potential.

In accordance with one embodiment of my invention there are provided a plurality of transformer networks energized from an alternating current supply circuit, each of the networks being provided with an electrical neutral. The electrical neutrals of each group of transformer networks are interconnected through an output transformer winding, which, in turn, is also provided wtih an electrical neutral. A plurality of electric valve paths having a single cathode potential, such for example, as a multiple anode, single cathode, electric valve device, interconnect the several terminals of the transformer networks with the electrical neutrals of the output transformer windings, while secondary windings coupled to the output transformer windings are serially connected to energize the load circuit.

For a better understanding of my invention, together with other and further objects thereof, reference is had to the following description, taken in connection to the accompanying drawing, and its scope will be pointed out in the appended claims. The single figure of the drawing illustrates an arrangement embodying my invention for transmitting energy from a three-phase alternating current supply circuit to a single-phase alternating current load circuit, asynchronous with respect to the supply circuit.

Referring now more particularly to the drawing, there is illustrated an improved electric valve frequency changing system embodying my invention for transmitting energy from a three-phase alternating current supply circuit 10 to a single-phase alternating current load circuit 11. This system includes a supply transformer bank consisting of a three-phase primary network 12 connected to the supply circuit 10 and two pairs or groups of star-connected secondary networks 13 and 14, and 15 and 16. The electrical neutrals of the networks 13 and 14, and 15 and 16 are interconnected through the transformer windings 17 and 18, respectively. The electrical neutrals of the transformer windings 17 and 18 are interconnected and are connected to close the circuits of their respective supply transformer networks through a plurality of electric valve paths, as for example, by connecting the phase terminals of the networks 13–16, inc., to the anodes 19–22, inc., respectively, of a multiple anode, single cathode vapor electric discharge device 23, and connecting the electrical neutrals of the windings 17 and 18 to the cathode of this device. The transformer windings 17 and 18 are provided with secondary windings 24 and 25, respectively, which are serially connected to energize the load circuit 11.

In order to periodically transfer current between the networks 13 and 14, and between the networks 15 and 16, the anodes 19–22, inc., are provided with associated control grids energized from the alternating current circuit 11, in case that circuit is connected to an independent source of electromotive force for determining its frequency, through a grid transformer 26 and current limiting resistors 27. The grids associated with the anodes 19 and 21 are excited with alternating potentials opposite in phase with respect to those impressed upon the grids associated with the anodes 20 and 22, as by exciting these two groups of grids from opposite halves of the secondary winding of a grid transformer 26. A reactance device 28 is preferably included in the neutral connection to the grid circuit, which because of the rectifying action of the grids converts the applied grid potentials into potentials of substantially rectangular wave form. While the grid transformer has been illustrated as being excited from the alternating current load circuit 11, if this circuit is not supplied with an independent source of electromotive force for determining its frequency, the grid transformer 26 may be energized from any suitable source of alternating potential of the desired frequency.

The general principles of operation of the above-described apparatus will be well understood by those skilled in the art. In brief, if it be assumed that initially a positive potential be impressed upon the grids associated with the anodes 19 and 21, the networks 13 and 15 connected thereto will act as rectifiers, applying unidirectional current to the left-hand portions of the transformer windings 17 and 18, respectively. Current flowing in the windings 17 and 18 will generate a half cycle of alternating current in the output windings 24 and 25 which are cumulative with respect to the load circuit 11. If the windings 24 and 25 were connected in parallel rather than in series, only one of the windings 13 and 15 would operate as a rectifier at any given instant, due to the fact that if a pair of anodes of an electric discharge device or a pair of electric valves are operating in parallel from two sources of potential or two phases of a polyphase circuit, the valve of higher anode potential tends to rob the current from the other valve so that the full current will be carried by a single valve. With the windings 24 and 25 connected in series, however, the current through the windings 17 and 18 are forced to equalize so that the windings 13 and 15 conduct simultaneously.

At the end of a given half cycle of alternating potential on the circuit 11, the grid potential reverses polarity, rendering nonconductive the anodes 19 and 21 and rendering conductive the anodes 20 and 22, thus transferring the current from the network 13 to the network 14 and from the network 15 to the network 16. The direction of current flow in the windings 17 and 18 is now reversed and a half cycle of alternating current of opposite polarity is induced in the windings 24 and 25 connected to the load circuit 11. By properly proportioning the leakage reactances of the windings 17 and 18 with respect to the windings 24 and 25, these windings may operate satisfactorily as transformers and at the same time minimize any short circuit currents due to the simultaneous conduction of the anodes associated with the networks 13 and 14, or 15 and 16.

By including the reactance device 28 in the neutral of the grid circuit, as illustrated, the potentials impressed upon the grids associated with the anodes 19-22, inc., are substantially rectangular in wave form and provide a more positive control. However, if the power factor on the alternating current circuit 11 departs substantially from unity, a more complicated grid circuit is preferable, such, for example, as that disclosed and claimed in my copending application, Serial No. 586,107, filed January 12, 1932 and assigned to the same assignee as the present application.

I have described my invention as applied to a frequency changing system for transmitting energy from a three-phase supply circuit to a single-phase load circuit, but it will be obvious to those skilled in the art that it is equally applicable to the transmission of energy between a supply circuit of any number of phases to a load circuit of any number of phases.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electric valve frequency changing system comprising an alternating current supply circuit, an independent alternating current load circuit, a plurality of electric valve converting apparatus each comprising a plurality of transformer networks energized from said supply circuit, a transformer winding interconnecting said networks, means for controlling the conductivity of said valves, and a plurality of windings each coupled to one of said transformer windings and serially connected to energize said load circuit.

2. An electric valve frequency changing system comprising an alternating current supply circuit, an independent alternating current load circuit, a plurality of groups of transformer networks energized from said supply circuit, a transformer winding interconnecting the networks of each group, a plurality of electric valves connected to close the circuits of said networks through said transformer windings, means for controlling the conductivity of said valves, and a plurality of windings each coupled to one of said transformer windings and serially connected to energize said load circuit.

3. An electric valve frequency changing system comprising an alternating current supply circuit, an independent alternating current load circuit, a plurality of pairs of transformer networks energized from said supply circuit, each of said networks being provided with an electrical neutral, a transformer winding interconnecting the networks of each pair and also provided with an electrical neutral, a plurality of electric valves each provided with a pair of main electrodes, a connection between the electrical neutrals of said transformer windings and a corresponding electrode of each of said valves, each of the terminals of said networks being connected to the other electrode of one of said valves, means for controlling the conductivity of said valves, and a plurality of windings each coupled to one of said transformer windings and serially connected to energize said load circuit.

BURNICE D. BEDFORD.